(12) United States Patent
Maeda et al.

(10) Patent No.: US 11,378,740 B2
(45) Date of Patent: Jul. 5, 2022

(54) OPTICAL WAVEGUIDE AND METHOD FOR MANUFACTURING SAME

(71) Applicant: PANASONIC INTELLECTUAL PROPERTY MANAGEMENT CO., LTD., Osaka (JP)

(72) Inventors: Shingo Maeda, Saga (JP); Naoyuki Kondou, Osaka (JP); Toru Nakashiba, Osaka (JP); Junko Kurizoe, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 142 days.

(21) Appl. No.: 16/759,637

(22) PCT Filed: Nov. 9, 2018

(86) PCT No.: PCT/JP2018/041590
§ 371 (c)(1),
(2) Date: Apr. 27, 2020

(87) PCT Pub. No.: WO2019/093460
PCT Pub. Date: May 16, 2019

(65) Prior Publication Data
US 2020/0292753 A1 Sep. 17, 2020

(30) Foreign Application Priority Data
Nov. 9, 2017 (JP) .............................. JP2017-216095

(51) Int. Cl.
*G02B 6/12* (2006.01)
*G02B 6/122* (2006.01)
(Continued)

(52) U.S. Cl.
CPC ............ *G02B 6/1223* (2013.01); *G02B 6/138* (2013.01); *G02B 6/43* (2013.01); *H04B 10/501* (2013.01)

(58) Field of Classification Search
CPC ........ G02B 6/1223; G02B 6/138; G02B 6/43; H04B 10/501
(Continued)

(56) References Cited

U.S. PATENT DOCUMENTS

| | | | |
|---|---|---|---|
| 6,222,972 B1* | 4/2001 | Yamamoto | G02B 1/048 385/126 |
| 2002/0021879 A1* | 2/2002 | Lee | G02B 6/10 385/129 |

(Continued)

FOREIGN PATENT DOCUMENTS

| CN | 102144180 A | 8/2011 |
|---|---|---|
| CN | 104126138 A | 10/2014 |

(Continued)

OTHER PUBLICATIONS

International Search Report, dated Jan. 29, 2019 by the Japan Patent Office (JPO), for International Application No. PCT/JP2018/041590.

*Primary Examiner* — Jerry M Blevins
(74) *Attorney, Agent, or Firm* — Greenblum & Bernstein, P.L.C.

(57) ABSTRACT

An optical waveguide is provided and includes: a core forming layer with a high refractive index; and a first clad layer with a low refractive index, bonded to a first main surface of the core forming layer. The core forming layer is provided in its plane direction with a core portion, lateral clad portions each having one side adjacent to a corresponding side of the core portion, and high refractive index portions each adjacent to the other side of a corresponding one of the lateral clad portions. The core portion is provided (Continued)

in its plane direction with a central region, and GI regions in each of which a refractive index continuously decreases from the central region toward an interface with the corresponding one of the lateral clad portions. The lateral clad portions each include a region having a constant refractive index.

9 Claims, 19 Drawing Sheets

(51) Int. Cl.
*G02B 6/138* (2006.01)
*G02B 6/43* (2006.01)
*H04B 10/50* (2013.01)

(58) Field of Classification Search
USPC .......................................................... 385/129
See application file for complete search history.

(56) References Cited

U.S. PATENT DOCUMENTS

| 2006/0127021 | A1  | 6/2006  | Erben et al. |
| 2011/0158596 | A1* | 6/2011  | Terada ................. G02B 6/1221 |
|              |     |         | 385/126 |
| 2011/0317960 | A1* | 12/2011 | Van Keuren ........... G02B 6/125 |
|              |     |         | 385/50 |
| 2013/0183015 | A1  | 7/2013  | Mori et al. |
| 2015/0016794 | A1  | 1/2015  | Mori et al. |

FOREIGN PATENT DOCUMENTS

| EP | 2 821 826 A1 | 1/2015 |
| JP | 2004-294720 A | 10/2004 |
| JP | 2010-060669 A | 3/2010 |
| JP | 2012-088634 A | 5/2012 |
| JP | 2012-163838 A | 8/2012 |
| JP | 2012-173707 A | 9/2012 |
| JP | 2016-102883 A | 6/2016 |
| WO | 2012/039393 A1 | 3/2012 |
| WO | 2012/060092 A1 | 5/2012 |

* cited by examiner

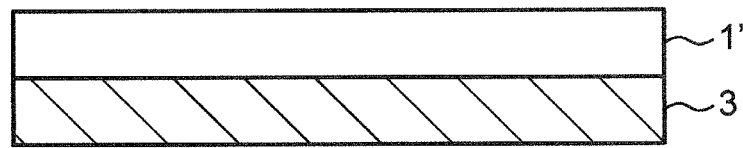
FIG.3A
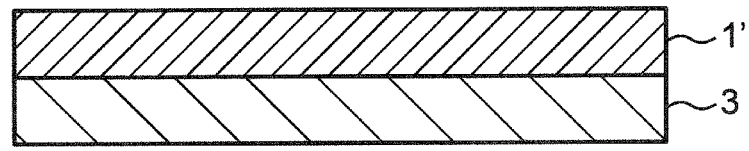
FIG.3B
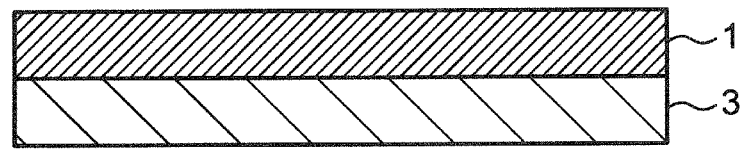
FIG.3C

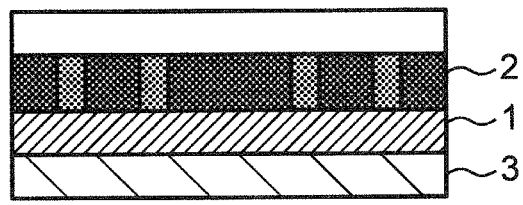
FIG.6A
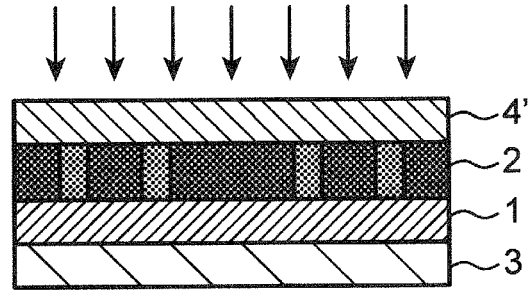
FIG.6B
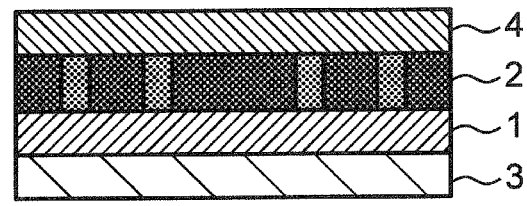
FIG.6C

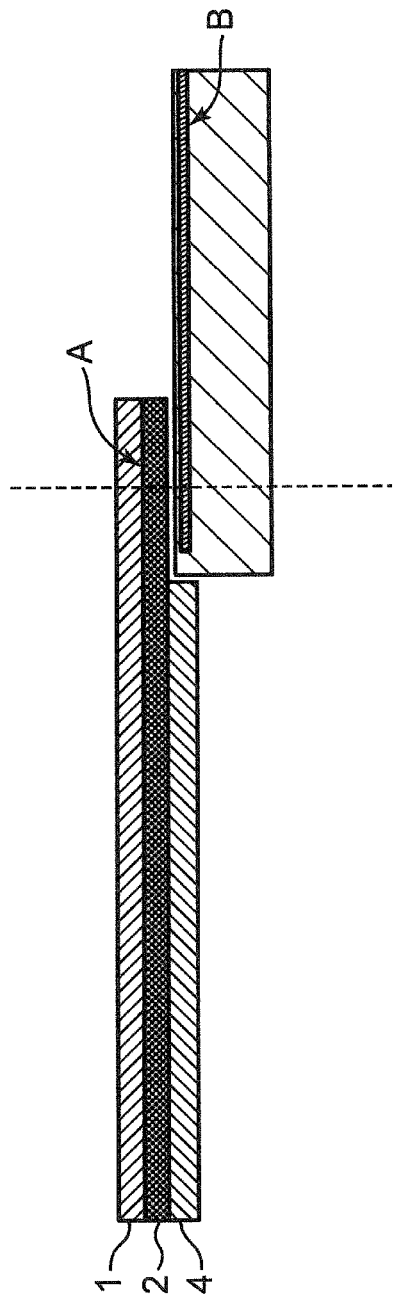

FIG.11A
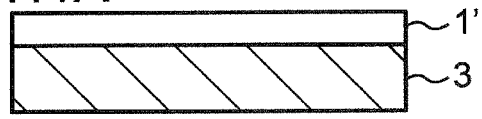
FIG.11B
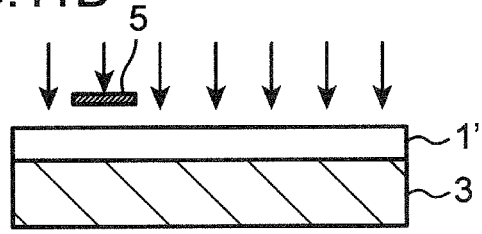
FIG.11C
UNCURED PORTION
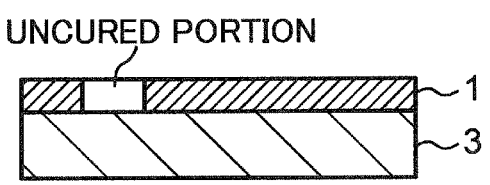
FIG.11D
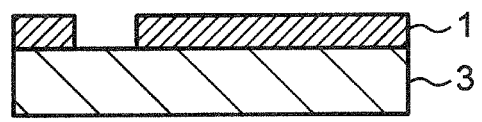
FIG.11E
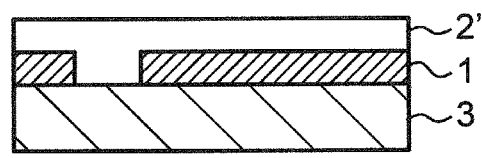
FIG.11F  11 (HALFTONE PORTION)
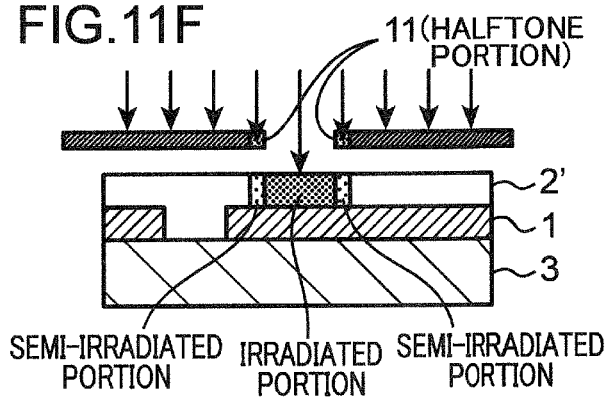
SEMI-IRRADIATED PORTION   IRRADIATED PORTION   SEMI-IRRADIATED PORTION
FIG.11G
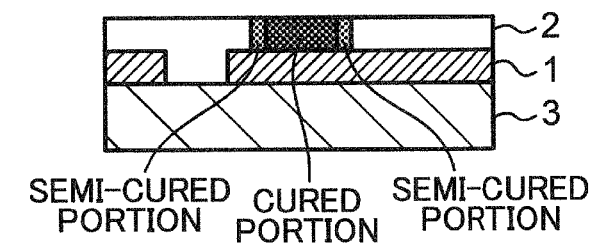
SEMI-CURED PORTION   CURED PORTION   SEMI-CURED PORTION
FIG.11H
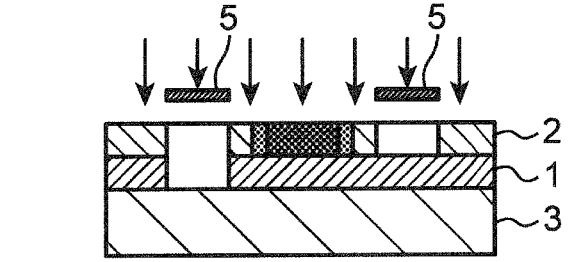
FIG.11I
UNCURED PORTION   UNCURED PORTION
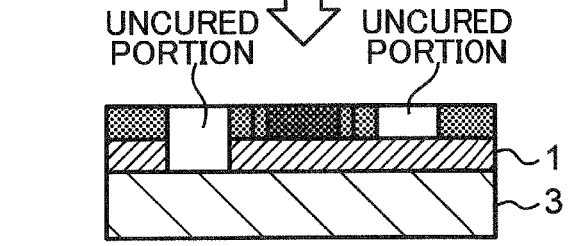
FIG.11J
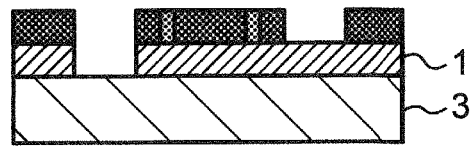

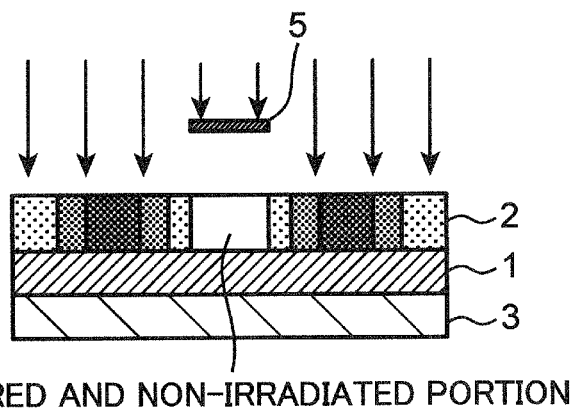
FIG.13A
UNCURED AND NON-IRRADIATED PORTION
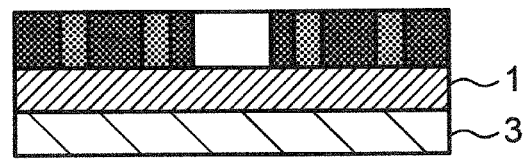
FIG.13B
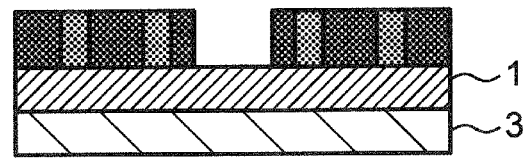
FIG.13C

OPTICAL WAVEGUIDE AND METHOD FOR MANUFACTURING SAME

TECHNICAL FIELD

The present invention relates to an optical waveguide, a method for manufacturing the same, and a substrate or member using the optical waveguide.

BACKGROUND ART

To address explosive increase in the amount of information transmission, a so-called optical waveguide (also referred to as an optical wiring or an optical transmission line) for transmitting a digital optical signal has attracted attention for short-distance ultra-high-speed transmission media in housings of electronic apparatuses and devices, instead of copper wiring causing a significant increase in cost for achieving accurate information transmission.

The optical waveguide is transparent at the wavelength of light to be used, and refers to a structure in which a cladding material having a relatively low refractive index surrounds the circumference of a linear transmission line made of a core material having a relatively high refractive index, or surrounds above and below a planar transmission line. While examples of the optical waveguide include an optical fiber, the optical fiber is less likely to increase in packaging density of its core. Thus, to achieve high density together with ultra-high-speed transmission, a resin optical waveguide provided with a plurality of linear cores or a planar core, formed inside a clad layer by patterning with light exposure on a plane, is becoming the most prominent (Patent Literature 1 and the like). An optical waveguide having a linear core may be called a ridge optical waveguide or a channel optical waveguide, and an optical waveguide having a planar core may be called a slab optical waveguide or a planar optical waveguide.

Here, the optical waveguide is classified into a step index type (SI type) and a graded index type (GI type) according to refractive index distribution. The SI-type optical waveguide includes a core having a constant refractive index and a clad having a constant refractive index lower than the core. In contrast, the GI-type optical waveguide includes a core with a refractive index that continuously changes to a refractive index of its clad. The GI-type optical waveguide has an advantage in that effect of confining light in the core increases and transmission loss can be reduced, as compared with the SI-type optical waveguide.

As an example of the GI-type optical waveguide having a refractive index that continuously changes as described above, an optical waveguide having a predetermined refractive index distribution has been reported (Patent Literature 2). Specifically, Patent Literature 2 discloses an optical waveguide including a core layer provided with core portions and lateral clad portions adjacent to respective lateral faces of the corresponding core portions, and clad layers layered on respective sides of the core layer, the core layer having a refractive index distribution W in a width direction of its cross section with at least two minimum values, at least one first maximum value, and at least two second maximum values less than the first maximum value, the refractive index distribution W having a region in which one of the second maximum values, one of the minimum values, the first maximum value, the other of the minimum values, and the other of the second maximum values align in this order, the region including a region between the two minimum values positioned across the first maximum value, corresponding to the core portion, and regions from the respective minimum values to the corresponding second maximum values, corresponding to the respective lateral clad portions, each of the minimum values being less than a mean refractive index in each of the lateral clad portions, a refractive index continuously changing throughout the refractive index distribution, the optical waveguide having a refractive index distribution. T in a thickness direction of its cross section with a third maximum value, a first portion in which a refractive index continuously decreases from a position of the third maximum value to the corresponding one of the clad layers, and a second portion positioned closer to a corresponding one of faces of the optical waveguide than the first portion, having a substantially constant refractive index, a region corresponding to the third maximum value and the first portion being the core portion, and a region corresponding to the second portion being the clad layer.

However, as shown in FIG. 2 of Patent Literature 2, the refractive index distribution in the optical waveguide described in Patent Literature 2 has the first maximum value larger than the second maximum values, and a refractive index continuously changes throughout the refractive index distribution. Thus, there is no place with a constant refractive index. In such a structure, while a large amount of incident light is distributed in a central portion of the core portion, as in the GI-type optical waveguide, the incident light is also distributed close to a position corresponding to each of the two minimum values. The lateral clad portions each have a refractive index that continuously increases from each of the minimum values to the corresponding one of the second maximum values, so that the lateral clad portions each also serve as a GI-type optical waveguide. This causes light leaking to a region of each of the minimum values to easily enter a region corresponding to the corresponding one of the second maximum values. Similarly, light leaking toward the region corresponding to the corresponding one of the second maximum values is also likely to leak to the adjacent core portion, and thus it is considered that a sufficient crosstalk suppression effect cannot be exhibited. In addition, incident light having a diameter closer to a diameter of the core portion is more likely to be directly incident on the region of each of the minimum values. Accordingly, the incident light is likely to enter a region corresponding to each second maximum value being a refractive index higher than that of each minimum value, so that it is considered that the incident light easily leaks to the adjacent core to cause the crosstalk to be worse.

Further, the optical waveguide described in Patent Literature 2 includes a core pattern causing a refractive index difference, the core pattern being formed by layering a composition for forming a core and a composition for forming a clad (refer to FIG. 8 and the like in Patent Literature 2), and irradiating a part of a layered body of the compositions with an active radiation. However, this formation method causes difficulty in curing a non-irradiated portion. Accordingly, a resin layer partly has an uncured portion, so that there is a high possibility of deteriorating reliability. Thus, to cure the non-irradiated portion, Patent Literature 2 describes a method for accelerating curing and reducing internal stress of a core layer by adding a catalyst precursor and a promoter in place of a polymerization initiator, and repeating heating three times under different conditions after irradiation with active radiation. However, such a method may increase costs.

In view of the above problem, it is an object of the present invention to provide an optical waveguide having good reliability of transmission of an optical signal and capable of being manufactured at low cost, and a method for manufacturing the same.

CITATION LIST

Patent Literature

Patent Literature 1: WO 2012/060092 A
Patent Literature 2: WO 2012/039393 A

SUMMARY OF INVENTION

As a result of intensive studies, the present inventors have found that the above problem can be solved by an optical waveguide having the following structure. Then, the present inventors have completed the present invention by further studying based on the knowledge above.

Specifically, an optical waveguide according to an aspect of the present invention includes a core forming layer with a high refractive index, and a first clad layer with a low refractive index, bonded to a first main surface of the core forming layer. The core forming layer is provided in its plane direction with a core portion (A), and lateral clad portions (B) adjacent to respective sides of the core portion (A). The core portion (A) is provided in its plane direction with a central region, and GI regions in each of which a refractive index continuously decreases from the central region toward an interface with a corresponding one of the lateral clad portions (B). The lateral clad portions (B) each include a region having a constant refractive index. Here, GI is an abbreviation for graded index.

According to another aspect of the present invention, a method for manufacturing the optical waveguide is proposed. The method for manufacturing the optical waveguide includes, in sequence: a layering step of bringing an uncured transparent resin film for forming the core forming layer into contact with the first clad layer, and bonding the uncured transparent resin film and the first clad layer to each other; a first exposure step of irradiating portions corresponding to the core portion (A) and the lateral clad portions (B) in a layered body obtained in the layering step with active energy rays, using a mask including an opening and a halftone region having a transmittance of 20 to 80% at side edge portions across the opening, to semi-cure the irradiated portions; and a second exposure step of irradiating the entire transparent resin film with active energy rays for further curing.

BRIEF DESCRIPTION OF DRAWINGS

FIG. 3A, FIG. 3B, and FIG. 3C illustrate a step of forming a first clad layer in a method for manufacturing an optical waveguide according to one of the present embodiments.

FIG. 6A, FIG. 6B, and FIG. 6C illustrate steps in a method for manufacturing an optical waveguide to form a second clad layer in an optical waveguide according to one of the present embodiments.

FIG. 8 is a schematic cross-sectional view illustrating an example of connecting an optical waveguide according to one of the present embodiments to another optical waveguide.

FIG. 11A, FIG. 11B, FIG. 11C, FIG. 11D, FIG. 11E, FIG. 11F, FIG. 11G, FIG. 11H, FIG. 11I, and FIG. 11J illustrate steps for manufacturing the optical waveguide illustrated in FIG. 10.

FIG. 13A, FIG. 13B, and FIG. 13C illustrate illustrates a modification of patterning of a high refractive index portion (C) of the core forming layer in FIG. 4.

DESCRIPTION OF EMBODIMENTS

Hereinafter, while embodiments of the present invention will be specifically described with reference to the drawings and the like, the present invention is not limited thereto.

[Optical Waveguide]

Figure 1:
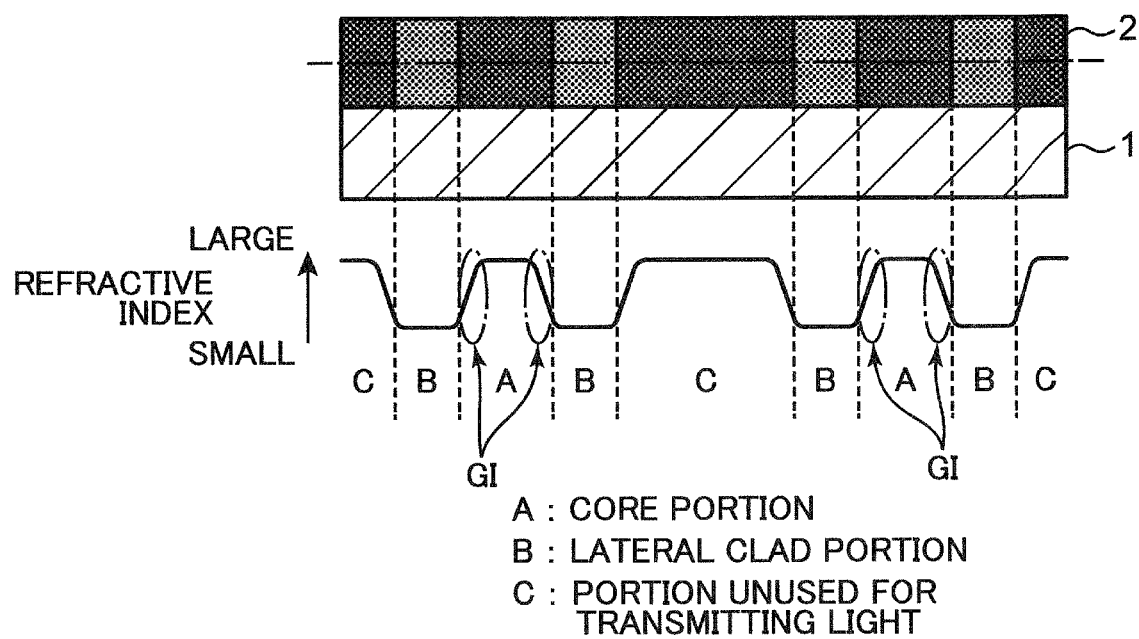
FIG. 1 is a schematic cross-sectional view illustrating structure of an optical waveguide according to an embodiment of the present invention.
Figure 2:
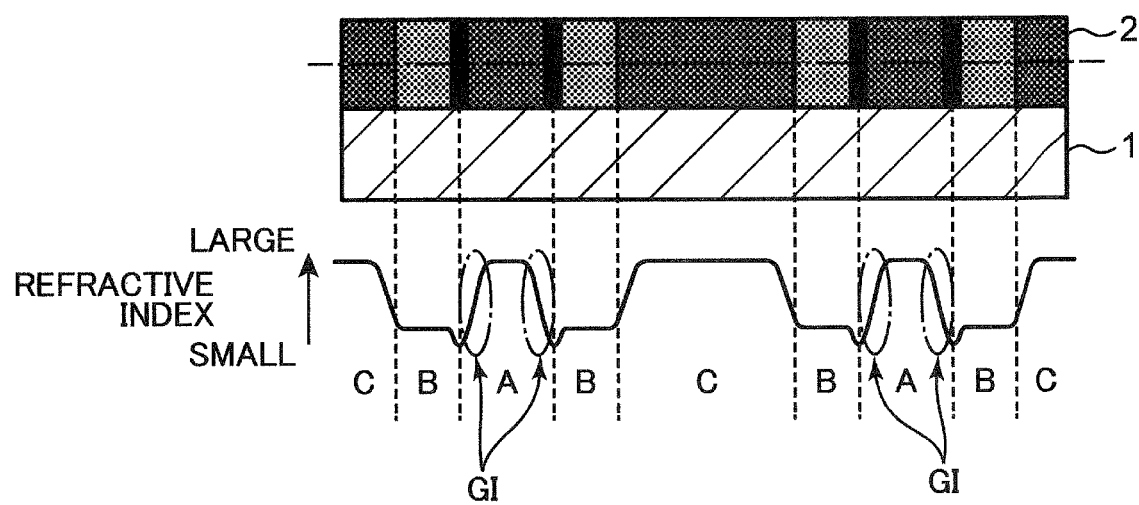
FIG. 2 is a schematic cross-sectional view illustrating structure of an optical waveguide according to another embodiment of the present invention.

An optical waveguide of the present embodiment includes a first clad layer 1 and a core forming layer 2, as illustrated in FIGS. 1 and 2. Here, FIGS. 1 and 2 each have an upper row that is a cross-sectional view of an optical waveguide and a lower row that is a graph showing refractive index distribution in portions defined by broken lines in the cross-sectional view of the optical waveguide in the upper row.

Representative reference numerals in the drawings indicate the following.
1 first clad layer,
1' uncured transparent resin film for forming first clad layer,
2 core forming layer, 2' uncured transparent resin film for forming core forming layer,
3 substrate,
4 second clad layer,
4' uncured transparent resin film for forming second clad,
5 mask,
11 halftone portion,
12 opening,
13 non-opening.

(Core Forming Layer)

As illustrated in FIGS. 1 and 2, the core forming layer 2 of the present embodiment is provided in its plane direction with a high refractive index core portion (A), lateral clad portions (B) each having one side adjacent to a corresponding side of the core portion (A), each having a low refractive index, and high refractive index portions (C) each adjacent to the other side of the corresponding one of the lateral clad portions (B). While the core portion (A) is used for transmitting light, the high refractive index portions (C) are each a region where the use of optical transmission is not normally assumed.

FIGS. 1 and 2 each have the lower row that shows refractive index distribution in portions defined by broken lines in cross-section of the core forming layer 2, and arrows each indicate that the refractive index increases from below. As illustrated in FIGS. 1 and 2, the core portion (A) includes GI regions (circled portions in FIGS. 1 and 2) in each of which the refractive index continuously decreases toward an interface with the corresponding one of the lateral clad portions (B), and the lateral clad portions (B) each include a region having a constant refractive index.

As illustrated in the lower row of FIG. 1, the lateral clad portions (B) each may include only a region having a constant refractive index, or may partially include a portion where the refractive index is lowered, between the core portion (A) and each of the lateral clad portions (B), as illustrated in the lower row of FIG. 2, as long as the lateral clad portions (B) each have a region having a constant refractive index.

As described above, the optical waveguide of the present embodiment includes the core portion (A) having the GI regions, which is a so-called graded index type (GI type) optical waveguide, and thus has an excellent effect of confining light in the core. In addition, the lateral clad portion (B) has a region having a constant refractive index at a lower level than that in the core portion (A), so that light can be more reliably confined in the core.

The lateral clad portion (B) including a region having a constant refractive index at a lower level than that in the core portion (A) has an advantage that will be described below. First, light guided inside the core portion (A) propagates while totally reflecting at the interface between the core portion (A) and the lateral clad portion (B)), so that the lateral clad portion (B) includes a region where light energy is partially distributed. If the lateral clad portion (B) includes no flat portion having a constant refractive index and the refractive index starts to increase with a minimum value, the light energy distributed in the region of the lateral clad portion (B) easily moves to a region where the refractive index increases. As a result, the light energy escapes from the core portion (A). In contrast, this phenomenon can be avoided by providing the flat portion, and the distribution can be easily maintained. As a result, the light energy can be more reliably confined in the region of the core portion (A).

As described below, the optical waveguide of the present embodiment enables a refractive index distribution (core pattern) to be formed by exposure treatment performed on the core forming layer 2. Thus, a developing step which has been conventionally required is not necessarily required. This also causes an advantage in reducing manufacturing cost.

As long as the core portion (A) includes the GI regions (GI) in each of which the refractive index continuously decreases toward the interface with the corresponding one of the lateral clad portions (B), and a central region between the left and right GI regions has a refractive index higher than that of the lateral clad portions (B) as a whole, distribution of the refractive index is not particularly limited. However, in a preferred embodiment, it is desirable that the core portion (A) includes a central region having a constant refractive index, as illustrated in the lower row of each of FIGS. 1 and 2. It is considered, accordingly, that a region through which light passes through expands in a central portion of the core to cause light to be more likely to be confined in the core. Including the region having a constant refractive index also causes an advantage in that the refractive index of the core is easily stabilized. In addition, there is also an advantage in that a margin can be provided for alignment at the time of connection with another optical wire or optical element.

While the high refractive index portion (C) is also not particularly limited as long as it has a higher refractive index than the lateral clad portion (B), it is preferable to have a region having a constant refractive index, as illustrated in the lower row of each of FIGS. 1 and 2. It is considered, accordingly, that light is likely to be confined in the same manner as described above.

In a further preferred embodiment, it is desirable that the high refractive index portion (C) includes a region having a constant refractive index, the region having a refractive index equivalent to that in a central region having a constant refractive index in the core portion (A). Here, the equivalent refractive index means that a difference in average value of the refractive indexes is 0.100 or less, preferably 0.050 or less, more preferably 0.020 or less, and most preferably 0.010 or less. It is preferable that the difference in average value of the refractive indexes is ideally zero, and the difference is 0.0001 or more, and preferably 0.0005 or more. It is considered, accordingly, that so-called crosstalk can be reduced. This is because a difference in refractive index between the lateral clad portion (B) and the high refractive index portion (C) increases, and the numerical aperture (NA) also increases, thereby causing light leaking to a region (C), which is not used for light transmission, to be also confined in the region (C). It considered, accordingly, that light is less likely to leak to an adjacent core portion to cause increase in effect of reducing crosstalk. Here, the numerical aperture is a measure of a level of a divergence angle that can be accepted by a waveguide when a light beam with divergence is incident into the waveguide, and is expressed by the following expression for a waveguide in the air with a refractive index of 1.

[Expression 1]

$$NA = \sin \theta m = \sqrt{N1^2 - N2^2} \qquad \text{(Expression 1)}$$

where, θm is a maximum allowable divergence angle (or converging angle), N1 is a refractive index of a core, and N2 is a refractive index of a clad.

In the present embodiment, "the refractive index becomes constant" refers to a flat state in which the refractive index does not substantially change, as illustrated in the refractive index distribution of each of FIGS. 1 and 2. In addition, "the refractive index does not substantially change" means that a change in the refractive index itself is less than 0.005, such as 0.004 of a difference between refractive indexes of 1.549 and 1.553.

Further, "the refractive index continuously decreases" means that the distribution of the refractive index seems to have a curve that smoothly changes.

The core portion (A) is not particularly limited also in thickness and width, and can be set to an appropriate thickness and width according to desired characteristics. Typically, the thickness is about 3 to 100 μm (preferably 6 to 80 μm), and the width is about 3 to 100 μm (preferably 6 to 80 μm).

The core forming layer 2 preferably have a curing degree of 50% or more. This causes the core portion (A), the lateral clad portion (B), and the high refractive index portion (C) in the core forming layer to have curing degrees close to each other, and causes advantages in reduction in internal stress that can be generated in a process of forming each portion and in making physical properties of a cured resin uniform. A more preferable curing degree is 70% or more.

The curing degree referred to in the present specification is calculated based on a peak of an epoxy group measured with a Fourier transform infrared spectrophotometer (FT-IR). More specifically, a peak (912 cm$^{-1}$) area of the epoxy group is compared with that of an uncured resin in FT-IR data including IR spectrum, a wavelength in a horizontal axis, and absorbance (Abs) in a vertical axis to calculate a residual ratio of the epoxy group, and a value obtained by subtracting the residual ratio from a complement of 100% assigned as a residual ratio of 1 is defined as the curing degree. As a reference value at the time of quantification, a peak (830 cm$^{-1}$) of a benzene ring having a stable composition is used.

That is, the "curing degree" in the present embodiment is represented by the following expression: curing degree (%) (1−((epoxy group peak area/benzene ring peak area) of cured product/(epoxy group peak area/benzene ring peak area) of uncured product))×100.

The areas are each determined using a baseline that is determined by drawing a tangent to two minimum values on the left and right of a peak in a graph of an IR spectrum.

The optical waveguide of the present embodiment is typically in the shape of an elongated strip or a plate, and has the above-described refractive index distribution (core pattern) that is repeatedly maintained in its longitudinal direction.

In the present embodiment, the material forming the core forming layer 2 is not particularly limited as long as it is a curable resin capable of obtaining the above-described refractive index distribution. Examples of the material include an epoxy-curable resin, an acrylic-curable resin, a cyanate-ester-curable resin, a resin acquired by combining the above resins, and a silicone-curable resin. Each of them is used as a member constituting an optical waveguide, so that their cured products are each required to have high transparency.

More specifically, a photo-curable and heat-curable resin is preferable. For example, an epoxy-curable resin and the like are available. This is because there is an advantage of being excellent in heat resistance, chemical resistance, and electrical insulation.

Among these resins, it is particularly preferable to use a resin in which two or more resins slightly different in refractive index and viscosity are blended. This is because there is an advantage that a refractive index distribution is easily generated at the time of heat treatment after exposure, and the refractive index distribution is easily controlled.

Typically, while a curing agent and/or a curing initiator (curing catalyst) are required to cure a curable resin, both of them can be used without limitation as long as they can achieve high transparency of a cured product, which is indispensable to an optical waveguide.

When the optical waveguide of the present embodiment is formed, it is preferable that the above-described resin is formed into a film and used as a resin film for forming a core layer, from the viewpoint of simplifying manufacturing.

(Clad Layer)

As illustrated in FIGS. 1 and 2, the first clad layer 1 constitutes a cladding located on one main surface (the lower surface in the drawings) of the core forming layer 2. The second clad layer provided as necessary constitutes a cladding located on a second main surface (the upper surface in the drawings) of the core forming layer 2.

The first clad layer 1 and the second clad layer are each not particularly limited in thickness, and each typically have a thickness of about 3 to 100 μm, and preferably 3 to 50 μm.

In the present embodiment, a material constituting the first clad layer 1 is not particularly limited, and a material having a lower refractive index at a transmission wavelength of guided light than a material constituting the core portion (A) can be appropriately selected and used. Specifically, examples of the material include an epoxy resin, an acrylic resin, a polycarbonate resin, a polyimide resin, and the like.

More specifically, a photo-curable and heat-curable resin is preferable. For example, an epoxy-curable resin and the like are available. This is because there is an advantage of being excellent in heat resistance, chemical resistance, and electrical insulation, Unlike the core forming layer 2 in which a refractive index distribution is intentionally formed, the first clad layer 1 may not need a refractive index distribution. However, each layer is sequentially formed in the process of manufacturing the optical waveguide of the present embodiment, so that the first clad layer 1 can be manufactured without a refractive index distribution by even using a plurality of epoxy resins are used. Thus, there is an advantage in facilitating adjustment of the refractive index and adjustment of other physical properties.

Typically, while a curing agent and/or a curing initiator (curing catalyst) are required to cure a curable resin, a material can be used without limitation as long as it can achieve high transparency of a cured product, which is indispensable to an optical waveguide, as with the material of the core forming layer 2.

When the optical waveguide of the present embodiment is formed, it is preferable that the above-described resin is formed into a film and used as an uncured transparent resin film for forming a clad layer, from the viewpoint of simplifying manufacturing.

When the optical waveguide of the present embodiment includes the second clad layer, a curable resin material as long as it has a lower refractive index at a transmission wavelength of guided light than the material of the core portion is used as a curable resin material for forming the second clad layer without any particular limitation. Typically, a curable resin material of a type similar to that of the material of the first clad layer 1 is used. In addition, an upper clad layer is not particularly limited in thickness.

While in FIGS. 1 and 2, etc., the optical waveguide is provided on a substrate 3, this is merely an example, and a support film made of polyethylene terephthalate (PET) or metal foil such as copper foil may be layered below the optical waveguide.

In addition, a protective film can be provided on an exposed surface of each of the core layer 2 and the first clad layer 1.

The optical waveguide of the present embodiment preferably has a numerical aperture (NA) of from 0.03 to 0.30, and more preferably has that of from 0.08 to 0.20.

The optical waveguide of the present embodiment enables light incident on one end of the core portion (A) to be transmitted to the other end by reflecting the light at an interface with the first clad layer 1 and at an interface with the lateral clad portion (B).

The optical waveguide according to the present embodiment is very excellent in effect of confining light in the core, and thus has excellent light transmission efficiency and reliability. Thus, the optical waveguide can be suitably used for various electronic devices.

It is considered that the optical waveguide of the present embodiment enables light to be sufficiently confined in the core to reduce crosstalk. In a manufacturing process of the core forming layer 2, a core pattern can be formed by changing refractive index distribution with exposure treatment, and heat treatment performed as necessary, so that a developing step is not necessarily required. Accordingly, the curing degree can be further increased throughout the core forming layer 2. This enables a highly reliable optical waveguide to be obtained while reducing manufacturing cost of the optical waveguide.

[Method for Manufacturing Optical Waveguide]

A method for manufacturing an optical waveguide of the present embodiment includes the following steps.

(1) A layering step of bringing an uncured transparent resin film for forming the core forming layer into contact with the first clad layer and bonding them to each other.

(2) A first exposure step of irradiating portions corresponding to the core portion (A) and the lateral clad portions (B) in a layered body obtained in the layering step with active energy rays, using a mask including an opening and a halftone region having a transmittance of 20 to 80% at side edge portions across the opening, to semi-cure the irradiated portions.

(3) A second exposure step of irradiating the entire transparent resin film with active energy rays for further curing.

These steps are performed in this order.

In addition, between (2) the first exposure step and (3) the second exposure step, a heat treatment step of performing heat treatment on the layered body may be performed.

Hereinafter, each step of the method for manufacturing an optical waveguide will be specifically described with reference to the drawings.

(Formation of First Clad Layer)

While in the present embodiment, a method for forming the first clad layer 1 is not particularly limited, steps as illustrated in FIG. 3 are exemplified, for example. Specifically, (a) an uncured transparent resin film 1' serving as a precursor for forming a first clad layer is brought into contact with the substrate 3 from above, and is bonded to the substrate 3 by being heated and pressed under reduced pressure, as needed. (b) The transparent resin film 1' is irradiated with active energy rays such as ultraviolet rays (indicated by arrows in FIG. 3(b)). (c) The transparent resin film 1' is cured by heat treatment, and the cured transparent resin film 1' is used as the first clad layer 1.

In the irradiation step illustrated in FIG. 3(b), exposure conditions are appropriately selected according to a type of a photosensitive material. For example, selected exposure conditions include conditions where a light beam having a wavelength of 365 nm is irradiated at 500 to 2500 mJ/cm$^2$ using an ultra-high pressure mercury lamp.

As illustrated in FIG. 3(c), performing post-curing by heat after photo-curing is also effective from the viewpoint of ensuring curing. The post-curing is preferably performed under heat treatment conditions having a temperature of about 80 to 160° C. and a time of about 20 to 120 minutes. However, the present invention is not particularly limited to this range, and it is needless to say that it is important to optimize the range according to a photosensitive material.

Patterning of the first clad layer also can be performed by performing mask exposure and development. In that case, FIG. 12 illustrates steps as follows. (a) The uncured transparent resin film 1' is brought into contact with the substrate 3 from above, and is bonded to the substrate 3 by being heated and pressed under reduced pressure, as needed. (b) The transparent resin film 1' is irradiated with active energy rays such as ultraviolet rays using a mask. (c) The resin in the irradiated portion is cured by heat treatment. (d) Then, unnecessary uncured portions are removed by development to obtain a desired pattern of the first clad layer 1.

(Formation of Core Forming Layer)

Figure 4A:
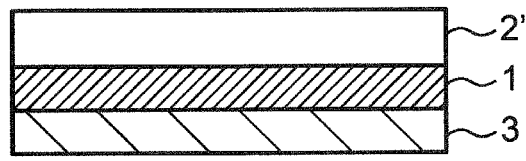
FIG. 4A, FIG. 4B, FIG. 4C, FIG. 4D, and FIG. 4E illustrate a step of forming a core forming layer in a method for manufacturing an optical waveguide according to one of the present embodiments.

Next, an example of a method for forming the core forming layer 2 will be described with reference to FIG. 4. As illustrated in FIG. 4(a), an uncured transparent resin film 2' serving as a precursor of a core forming layer is brought into contact with the first clad layer 1, and is bonded to the first clad layer 1 by being heated and pressed under reduced pressure. Here, before the transparent resin film 2' is bonded to the first clad layer 1, a surface of the first clad layer 1 may be subjected to surface treatment by plasma treatment or the like.

Figure 4B:
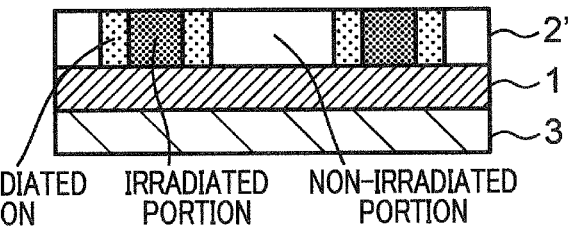

Then, as illustrated in FIG. 4(b), an irradiation step of radiating active energy rays (arrows) using a mask 5 to cure the resin component in the irradiated portion is performed. Examples of the active energy rays include ultraviolet rays for ease of handling.

Figure 5:
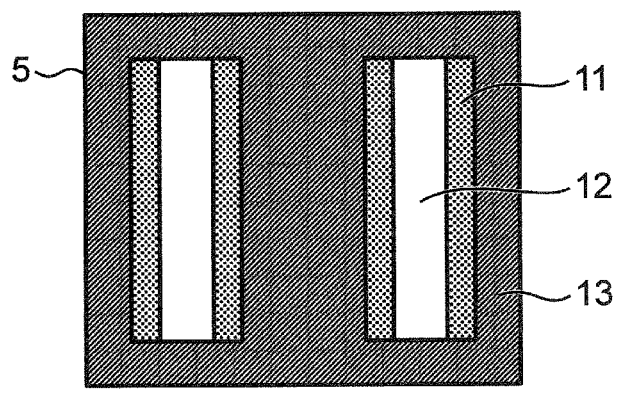
FIG. 5 is a schematic diagram (top view) illustrating an example of a halftone mask that can be used in a method for manufacturing an optical waveguide, according to the present embodiment.
Figure 7A:
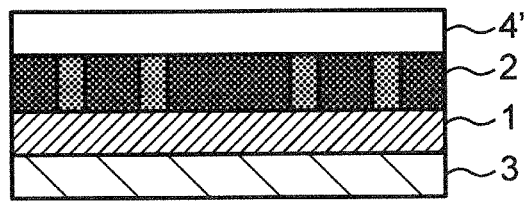
FIG. 7A, FIG. 7B, FIG. 7C, and FIG. 7D illustrate steps of patterning a second clad layer when the second clad layer is formed in an optical waveguide according to one of the present embodiments.
Figure 7B:
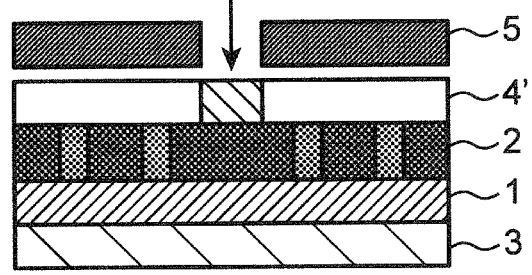
Figure 7C:
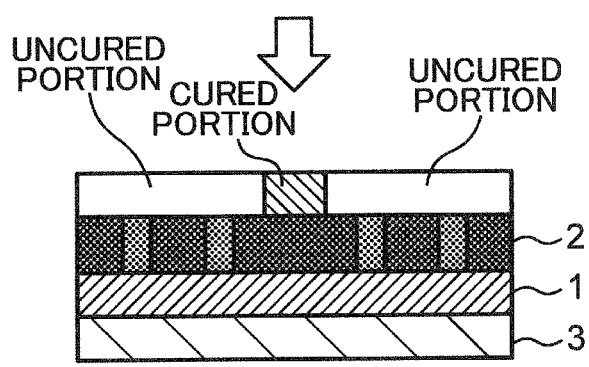
Figure 7D:
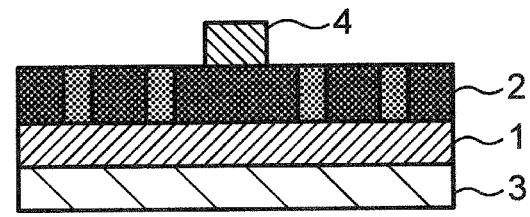

At this time, it is preferable to use a halftone mask as illustrated in FIG. 5 as the mask 5. The halftone mask includes a halftone portion 11 having a transmittance of the active energy rays of from 20 to 80%, an opening 12 having a transmittance of glass when the mask is made of the glass, for example, and a non-opening portion 13 having a transmittance of 0%. The halftone portion 11 preferably has a transmittance of from 20 to 50%. The halftone portion 11 is located at a side edge of the opening 12.

When the mask 5 including the halftone portion 11 as described above is used, an irradiated portion, a semi-irradiated portion, and a non-irradiated portion are formed on the transparent resin film T as illustrated in FIG. 4(b). That is, after the irradiation, the portion corresponding to the opening 12 of the mask 5 becomes the irradiated portion, the portion corresponding to the halftone portion 11 becomes the semi-irradiated portion, and the portion corresponding to the non-opening portion 13 becomes the non-irradiated portion.

Figure 4C:
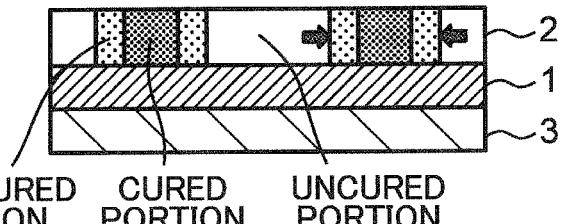
Figure 4D:
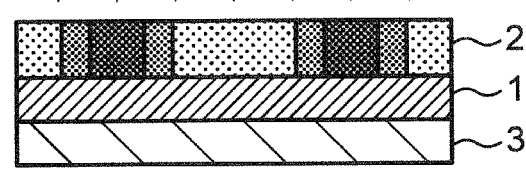
Figure 4E:
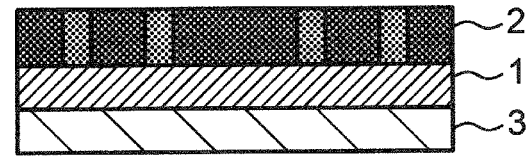

After that, performing heat treatment as illustrated in FIG. 4(e) reduces a monomer concentration of a low refractive index (n) in the irradiated portion to cause a low refractive index monomer to move from the non-irradiated portion to the irradiated portion, and thus it is considered that a refractive index changes accordingly. Then, as illustrated in FIG. 4(c), the irradiated portion becomes a cured portion, the semi-irradiated portion becomes a semi-cured portion, and the non-irradiated portion becomes an uncured portion. Accordingly, the irradiated portion (cured portion) corresponds to the core portion (A) having a high refractive index, the semi-irradiated portion (semi-cured portion) corresponds to the lateral clad portion (B), and the non-irradiated portion (uncured portion)) corresponds to the high refractive index portion (C). At the same time, a portion corresponding to the GI region in the core portion (A) is formed.

It is considered that the refractive index changes and the refractive index distribution is formed, according to a mechanism as follows. The low refractive index monomer moving from the half-irradiated portion to the irradiated portion has an amount of movement (movement speed) that decreases to less than an amount of movement of the low refractive index monomer moving from the non-irradiated portion to the semi-irradiated portion because the irradiated portion has a curing degree having increased greatly already in the step illustrated in FIG. 4(b). As a result, the low refractive index monomer moving from the semi-irradiated portion to the irradiated portion does not reach a central region of the irradiated portion and is consumed by curing reaction, so that the GI region is formed in which the refractive index decreases continuously toward the semi-irradiated portion. Meanwhile, it is considered that a large amount of low refractive index monomer flows into the semi-irradiated portion from the non-irradiated portion, so that the refractive index greatly decreases, and thus the lateral clad portion (B) having a low refractive index is formed. In addition, most of low refractive index monomer moving from the non-irradiated portion to the semi-irradiated portion is supplied from a region adjacent to the semi-irradiated portion in the non-irradiated portion, so that a little amount of low refractive index monomer moves from the back of the non-irradiated portion. Thus, the vicinity described above of the non-irradiated portion is a portion (second GI region) where the refractive index continuously increases toward the back of the non-irradiated portion. Further, movement of the low-refractive-index monomer is small in a backward region in the non-irradiated portion, so that the refractive index does not almost change in the backward region while remaining high, and thus the refractive index becomes constant.

Next, as illustrated in FIG. 4(d), the entire transparent resin film 2' (core forming layer 2) is irradiated with active energy rays (arrows) to cure the transparent resin film 2' (core forming layer 2) as a whole. In this step, the refractive index of the core forming layer 2 is fixed, and the entire core forming layer is cured.

Finally, as illustrated in FIG. 4(e), the optical waveguide of the present embodiment can be obtained by performing heat treatment again to cure the non-irradiated portion.

In the irradiation steps illustrated in FIGS. 4(b) and 4(d), exposure conditions are appropriately selected according to a type of a photosensitive material. For example, selected exposure conditions include conditions where a light beam having a wavelength of 365 nm is irradiated at 500 to 2500 mJ/cm$^2$ using an ultra-high pressure mercury lamp.

As illustrated in FIGS. 4(c) and 4(e), performing post-curing by heat after photo-curing is also effective from the viewpoint of ensuring curing. The post-curing is preferably performed under heat treatment conditions having a temperature of about 80 to 160° C. and a time of about 20 to 120 minutes. However, the present invention is not particularly limited to this range, and it is needless to say that it is important to optimize the range according to a photosensitive material.

In the optical waveguide of the present embodiment, the core forming layer 2 preferably has a curing degree of 50% or more as described above.

If necessary, mask exposure may be performed at the time of the second exposure, and patterning may be further performed on a portion of the core forming layer 2, corresponding to the high refractive index portion (C), by performing development. In this case, as illustrated in FIG. 13, a desired pattern can be obtained as follows. (a) The core forming layer 2 except an unnecessary region of the uncured portion is irradiated with active energy rays such as ultraviolet rays using the mask 5. (e) A necessary portion of the core layer is cured by heat treatment, (d) An unnecessary portion is removed by development.

As described above, in the present embodiment, the non-irradiated portion may be cured by only blending a photoacid generator as a curing initiator, and the heat treatment may be performed at a temperature at which the resin is sufficiently cured. Thus, unlike the conventional method disclosed in Patent Literature 2, complicated temperature control is not required. Accordingly, stable performance can be obtained, and dryers for different temperatures are not required to be prepared. From this viewpoint, an optical waveguide with high reliability can be obtained efficiently at low cost.

(Formation of Second Clad Layer)

While there is no particular limitation when a second clad layer 4 is formed on the core forming layer 2, steps as illustrated in FIG. 6 can be used, for example.

Specifically, (a) an uncured transparent resin film 4' serving as a precursor for forming a second clad is brought into contact with the core forming layer 2 from above, and is bonded to the core forming layer 2 by being heated and pressed under reduced pressure, as needed. Here, before the transparent resin film 4' is bonded to the core forming layer 2, a surface of the core forming layer 2 may be subjected to surface treatment by plasma treatment or the like. (b) Next, the transparent resin film 4' is irradiated with active energy rays (arrows) such as ultraviolet rays, and (c) the transparent resin film 4' is cured by heat treatment to form the second clad layer 4.

In the irradiation step illustrated in FIG. 6(b), exposure conditions are appropriately selected according to a type of a photosensitive material. For example, selected exposure conditions include conditions where a light beam having a wavelength of 365 nm is irradiated at 500 to 2500 mJ/cm$^2$ using an ultra-high pressure mercury lamp.

As illustrated in FIG. 6(c), performing post-curing by heat after photo-curing is also effective from the viewpoint of ensuring curing. The post-curing is preferably performed under heat treatment conditions having a temperature of about 80 to 160° C. and a time of about 20 to 120 minutes. However, the present invention is not particularly limited to this range, and it is needless to say that it is important to optimize the range according to a photosensitive material.

In addition, the second clad layer 4 can be patterned. In that case, as illustrated in FIG. 7, (a) the uncured transparent resin film 4' is brought into contact with the core forming layer 2 from above, and is bonded to the core forming layer 2 by being heated and pressed under reduced pressure, as needed. (b) The transparent resin film 4' is irradiated with active energy rays (arrows) such as ultraviolet rays using the mask 5. (c) The transparent resin film 4' is then cured by heat treatment. (d) If necessary, the second clad layer 4 may be formed by removing an unnecessary uncured portion by development. Changing the shape of the mask 5 enables desired patterning to be obtained.

The structure described above enables refraction of the core layer to be set to a desired distribution only by exposing and heat-treating the core forming layer 2 without performing a development step that is conventionally required, so that manufacturing costs can be reduced. The first clad layer, the high refractive portion (C) of the core forming layer 2, and the second clad layer 4 can be appropriately patterned while requiring a development step, so that optical waveguides having various structures can be obtained.

[Joined Body]

While the optical waveguide of the present embodiment can be used alone, a plurality of the optical waveguides can also be used as a joined body.

At this time, while two or more same optical waveguides may be joined, an optical waveguide A of the present embodiment can be combined with an optical waveguide different from the optical waveguide A (e.g., a silicon optical waveguide).

Figure 9:
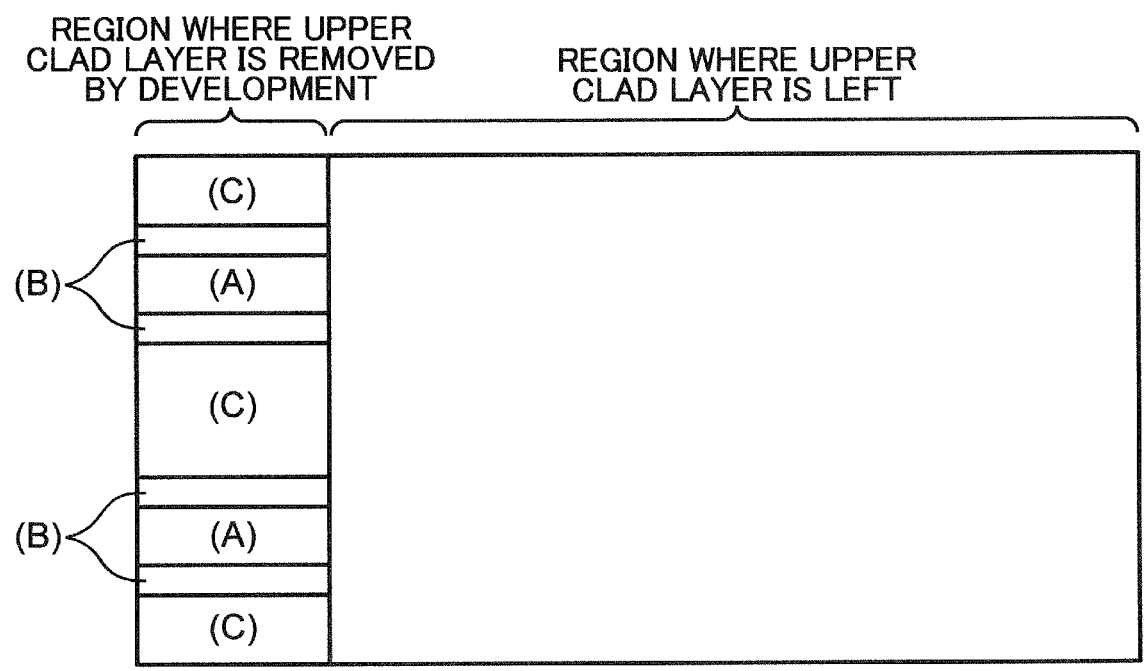
FIG. 9 is a schematic top view illustrating an example of connecting an optical waveguide according to one of the present embodiments to another optical waveguide.

Specifically, for example, as illustrated in FIG. 8, a silicon (Si) optical waveguide B can be joined to a portion of the optical waveguide A of the present embodiment, the portion being acquired by removing a part of the second clad layer 4 by development, and exposing a part of the core forming layer 2. Alternatively, a silicon (Si) optical waveguide can be joined to the optical waveguide A without the second clad layer 4. FIG. 9 is a top view of the optical waveguide of the present embodiment. The portion acquired by removing the second clad layer 4 has an exposed upper surface of the core forming layer 2.

Such a joined body requires a part of the second clad layer 4 to be removed, or a core of the optical waveguide to be exposed without providing the second clad layer 4, as described above. However, a forming method as disclosed in Patent Literature 2 is configured to preliminarily layer an uncured lower clad layer, a core layer, and an upper clad layer, so that a structure in which only a part of the upper clad layer is removed cannot be formed. The present embodiment has an advantage in that an optical waveguide having structure as described above can be easily obtained.

[Self-Alignment Structure]

Figure 14A:
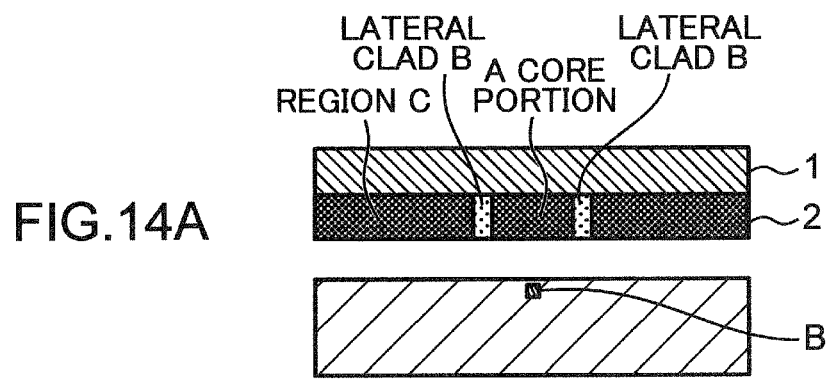
FIG. 14A, FIG. 14B, and FIG. 14C are schematic cross-sectional views illustrating an example of a self-alignment structure in the example of connection as illustrated in FIG. 8.
Figure 14B:
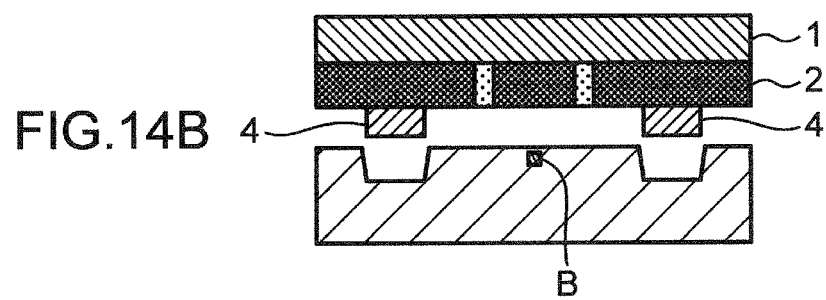
Figure 14C:
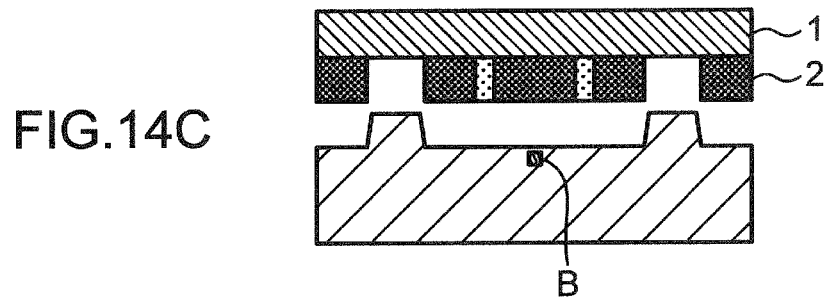

As a structure that facilitates positioning when the optical waveguide A and the silicon (Si) optical waveguide B are joined as described above, a self-alignment structure as illustrated in FIG. 14 has been proposed. FIG. 14 is a cross-sectional view taken along a dotted line in FIG. 8. The method for manufacturing an optical waveguide of the present embodiment enables forming refractive index distribution without developing the core forming layer 2, and pattering each layer appropriately by development, so that an optical waveguide with a self-alignment structure as described above can be easily manufactured. The structure as illustrated in FIG. 14(*b*) can be obtained by developing and patterning the second clad layer 4 by steps as in FIG. 7, and the structure as illustrated in FIG. 14(*c*) can be obtained by developing and removing a part of the high refractive index portion (C) that is a non-irradiated portion in the first exposure of the core forming layer 2 by steps as in FIG. 13. These structures are difficult structures that cannot be manufactured by the manufacturing method of Patent Literature 1 and the manufacturing method of Patent Literature 2, but can be easily obtained by the method for manufacturing an optical waveguide of the present embodiment.

[Optical Waveguides of Other Embodiments]

Optical waveguides of other embodiments include an optical waveguide including a first clad layer 1 and a core forming layer 2, the core forming layer 2 being provided in its plane direction with a core portion (A), lateral clad portions (B) each having one side adjacent to a corresponding side of the core portion (A), and high refractive index portions (C) each adjacent to the other side of the corresponding one of the lateral clad portions (B). The core portion (A), the lateral clad portions (B), and the high refractive index portion (C), each have a refractive index continuously changing, and at least the core portion (A) and each of the high refractive index portions (C) have a substantially identical refractive index. The high refractive index portions (C) each include a portion where the refractive index is discontinuous.

Figure 10:
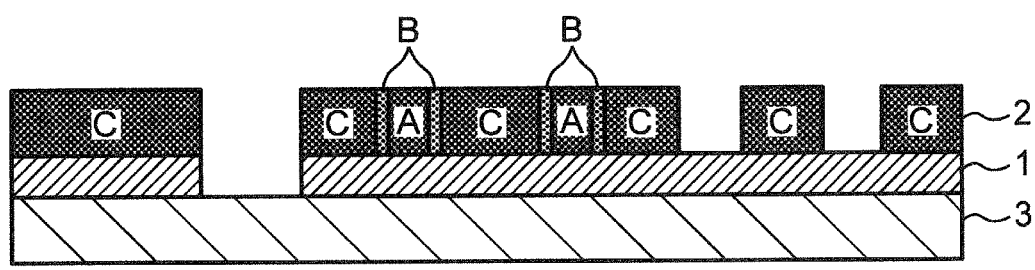
FIG. 10 is a schematic cross-sectional view illustrating structure for an optical waveguide according to another embodiment of the present invention.
Figure 12A:
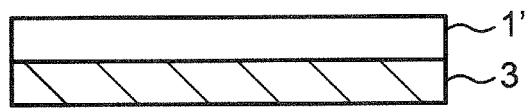
FIG. 12A, FIG. 12B, FIG. 12C, and FIG. 12D illustrate a modification of patterning of the first clad layer in FIG. 3.
Figure 12B:
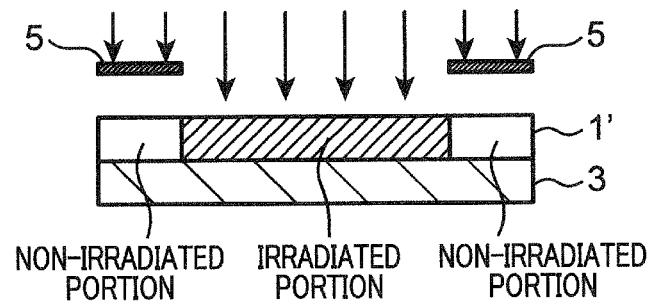
Figure 12C:
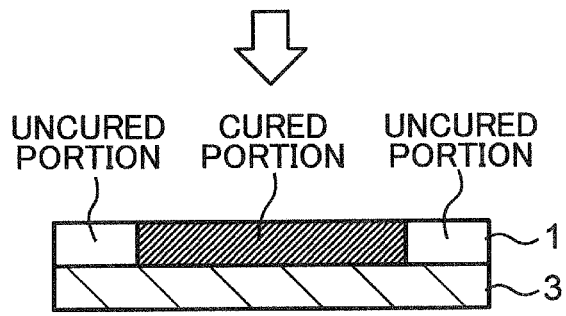
Figure 12D:
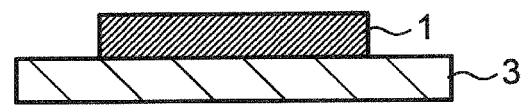

For example, FIG. 10 is a cross-sectional view of an example of such an optical waveguide. In this example, an air layer is provided in a part of the high refractive index portions (C), so that the refractive index can be discontinuous.

Such a structure causes an advantage of improvement in visibility at the time of observation from the vertical direction of the main surface of the optical waveguide. For example, when the air layer is formed as a mark for positioning, more accurate positioning can be performed than when a mark with continuous refractive index distribution is formed. In addition, when a portion with a discontinuous refractive index of the core forming layer 2 is formed of an air layer (here, it does not penetrate to the first clad layer 1), and the first clad layer 1 has a portion corresponding to the air layer of the core forming layer 2, being formed also of an air layer (it penetrates to the first clad layer 1), there is an advantage in facilitating access to the substrate 3 in a base from the surface of the optical waveguide. For example, when electrode pads are formed on the substrate 3, components can be mounted while an optical waveguide layer is present.

As described above, a refractive index of each part in the core forming layer 2 is preferably as follows: the core portion (A) and the high refractive index portion (C) each have a substantially identical refractive index; and the substantially identical refractive index is larger than a refractive index of the lateral clad portion (B). This is advantageous because the crosstalk is reduced as described above. This is because when light leaks from the core portion (A), it passes through the high refractive index portion (C) interposed between the lateral clad portions (B), having a low refractive index, before moving to the adjacent core portion, thereby causing an effect of being confined in the high refractive index portion (C).

A method for obtaining such an optical waveguide will be briefly described with reference to FIG. 11. First, (a) an uncured transparent resin film 1' serving as a precursor of the first clad layer 1 is brought into contact with the substrate 3 from above, and is bonded to the substrate 3 by being heated and pressed under reduced pressure, as needed. Next, (b) the transparent resin film 1' is irradiated with active energy rays such as ultraviolet rays (indicated by arrows in FIG. 11) using the mask 5. (c) The irradiated portion is cured by heat treatment. (d) If necessary, a portion of an uncured resin that has not been irradiated is removed by development. Next, (e) a transparent resin film 2' is brought into contact with a lower clad layer 1 and the substrate 3 from above, and is bonded to them by being heated and pressed under reduced pressure, as needed. Then, (f) the transparent resin film 2' is irradiated with active energy rays such as ultraviolet rays using the mask 5 including a halftone portion 11, and (g) a core pattern is obtained by heat treatment. After that, (h) the core forming layer 2 formed with refractive index distribution is irradiated using the mask 5. At this time, when an air layer passing through not only the core forming layer 2 but also the first clad layer 1 is formed, a region corresponding to a removing pattern of the first clad layer 1 is defined as a non-irradiated portion. Next, (i) heat treatment is performed to cure the irradiated portion, and (j) development is performed to remove unnecessary resin to obtain a structure including a portion with a discontinuous refractive index of the core forming layer 2 (e.g., a hole passing through only the core forming layer 2), and a hole passing through the core forming layer 2 and the first clad layer 1.

While the present invention will be further described below in detail using examples, the scope of the present invention is not limited to the examples.

EXAMPLES

First, a method for manufacturing a resin film used in the present example will be described.

(Manufacturing of Resin Film for Forming First Clad Layer and Second Clad Layer)

Each of ingredients was weighed into a glass container, the ingredients containing 14 parts by mass of liquid aliphatic epoxy resin (Celloxide 2021P available from Daicel Chemical Industries, Ltd.), 23 parts by mass of trifunctional aromatic epoxy resin (VG3101 available from Printec Corp.), 25 parts by mass of solid bisphenol A-type epoxy resin (1006FS available from Mitsubishi Chemical Corp.), 38 parts by mass of solid hydrogenated bisphenol A type epoxy resin (YX8040 available from Mitsubishi Chemical Corp.), and 1 part by mass of photocationic curing initiator (SP-170 available from Adeka Corp.). Into the glass container, a mixed solvent of 2-butanone and toluene was added as a solvent. The composition in this glass container was stirred under reflux at 80° C. This operation allowed a varnish in which all solids were dissolved to be obtained. The obtained varnish was filtered through a membrane filter made of polytetrafluoroethylene (PTFE) having a pore size of 1 μm to remove solid foreign substances, and then was defoamed under reduced pressure. The varnish prepared in this manner was applied to a PET film (A4100 available from Toyobo Co., Ltd.) using a multicoater with a comma coater head, available from Hirano Tecseed, Co., Ltd. The applied PET film was dried at 125° C. to form a resin layer having a predetermined thickness. On the resin layer, an oriented polypropylene film (OPP) was heat-laminated as a cover film (release film). This operation allowed a resin film for a clad layer to be obtained. At this time, the obtained resin film for a clad had a thickness of 35 μm acquired by adjusting a thickness at the time of the application (applied thickness).

(Manufacturing of Resin Film for Forming Core Forming Layer)

A resin film for a core forming layer was manufactured as with the resin film for a clad layer except a material to be used, the material containing 23 parts by mass of liquid aliphatic epoxy resin (Celloxide 2021P available from Daicel Chemical Industries, Ltd.), 21 parts by mass of trifunctional aromatic epoxy resin (VG3101 available from Printec Corp.), 56 parts by mass of solid bisphenol A-type epoxy resin (1006FS available from Mitsubishi Chemical Corp.), 1 part by mass of photocationic curing initiator (SP-170 available from Adeka Corp.), and 0.3 parts by mass of antioxidant (AO-60 available from Adeka Corp.). At this time, the obtained resin film for a core forming layer had a thickness of 25 μm acquired by adjusting a thickness at the time of applying (applied thickness).

(Refractive Index)

A refractive index of each of the cured resin film for a clad layer and the cured resin film for a core forming layer was measured using a refractive index measuring device available from Atago Co., Ltd. As a result, the cured resin film for the clad layer (clad layer) had a refractive index of 1.554, and the cured resin film for a core forming layer (core portion) had a refractive index of 1.581. Then, the numerical aperture (NA) calculated from these indexes was about 0.29.

(Optical Waveguide Fabrication)

Example

First, copper foil on both sides of a glass epoxy substrate (R1515W available from Panasonic Corp.) was removed by etching. This etched-off substrate was used as a substrate. The resin film for a clad layer with a thickness of 35 μm manufactured by the above-described method was laminated on a surface of the substrate using a vacuum laminator (V-130). Then, the laminated resin film for a clad layer was irradiated with ultraviolet light at 2 J/cm$^2$ using an ultra-high pressure mercury lamp. After that, the release film of the resin film for a clad layer was peeled off. Subsequently, the substrate was heat-treated at 140° C., so that a first clad layer acquired by curing the resin film for a clad layer was formed on the substrate. Next, after the first clad layer was subjected to oxygen plasma treatment, on the surface thereof, the resin film for a core layer with a thickness of 25 μm manufactured by the above-described method was laminated on a surface of the first clad layer using the vacuum laminator (V-130).

Figure 15:
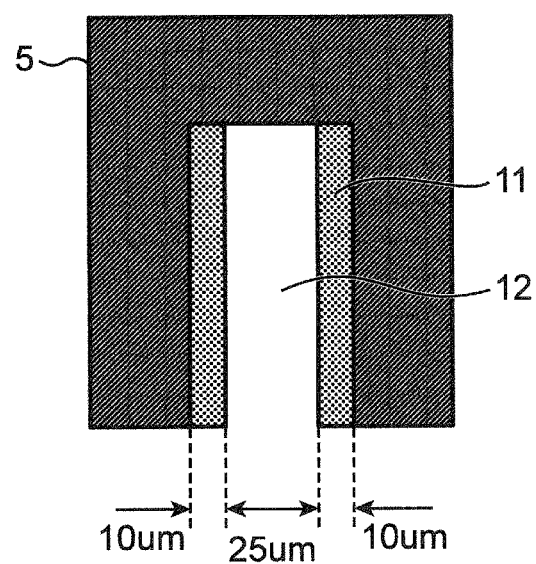
FIG. 15 is a schematic top view of a halftone mask used in an example.

Then, a glass mask 5 as illustrated in FIG. 15, formed with a pattern having an opening 12 with a width of 25 μm and a length of 100 mm, and halftone portions 11 each with a transmittance of 40% and a thickness of 10 μm on both sides of the opening, was placed on a surface of the resin film for a core forming layer. After that, the resin film for a core forming layer was irradiated with ultraviolet light in amount at 2 J/cm$^2$ using an ultra-high pressure mercury lamp adjusted to radiate substantially parallel light. Subsequently, the resin film for a core forming layer was heat-treated at 140° C. for 10 minutes, and portions of the resin film for a core forming layer, corresponding to the opening and the halftone portions were photo-cured. Next, the entire resin film for a core forming layer was irradiated with ultraviolet light in amount at 2 J/cm$^2$ using the ultra-high pressure mercury lamp, and then was heat-treated at 140° C. for 10 minutes to cure the entire resin film for a core forming layer. Accordingly, a core forming layer having a core portion and a lateral clad portion was obtained on the first clad layer.

Next, after a core layer was subjected to oxygen plasma treatment, a resin film for a clad layer for forming a second clad layer was laminated using the vacuum laminator (V-130). Then, a resin film for an upper clad layer was irradiated with ultraviolet light in amount at 2 J/cm2 using the ultra-high pressure mercury lamp, and was cured by heat treatment to obtain an optical waveguide including the first clad layer, the core forming layer having the core portion and the lateral clad portion, and the second clad layer.

Figure 16:
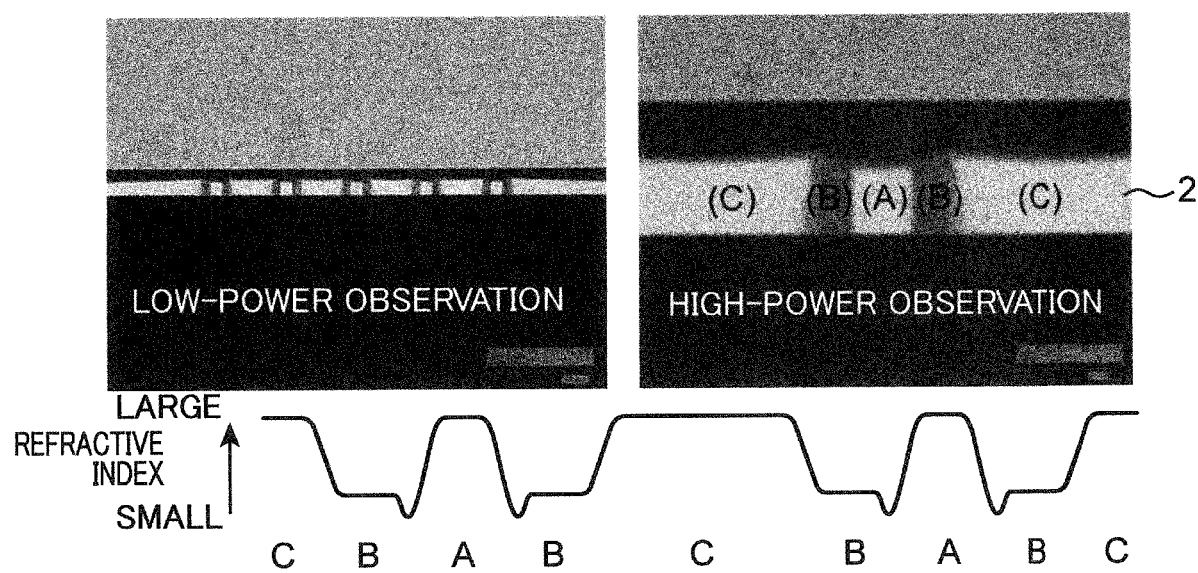
FIG. 16 is a cross-sectional photograph and a graph showing a refractive index distribution of an optical waveguide of an example.

Refractive index distribution of the core forming layer of the obtained optical waveguide was measured using a quantitative phase microscope available from PiPhotonics, Inc. FIG. 16 shows photographs and refractive index distribution of the optical waveguide of an example. FIG. 16 has the lower row that shows refractive index distribution in portions defined by broken lines in cross-section of a core forming layer 2, and the arrow indicate that the refractive index increases from below. As is clear from the refractive index distribution, the comparative example does not include a region having a constant refractive index in lateral clad portions (B).

Comparative Example

Figure 17:
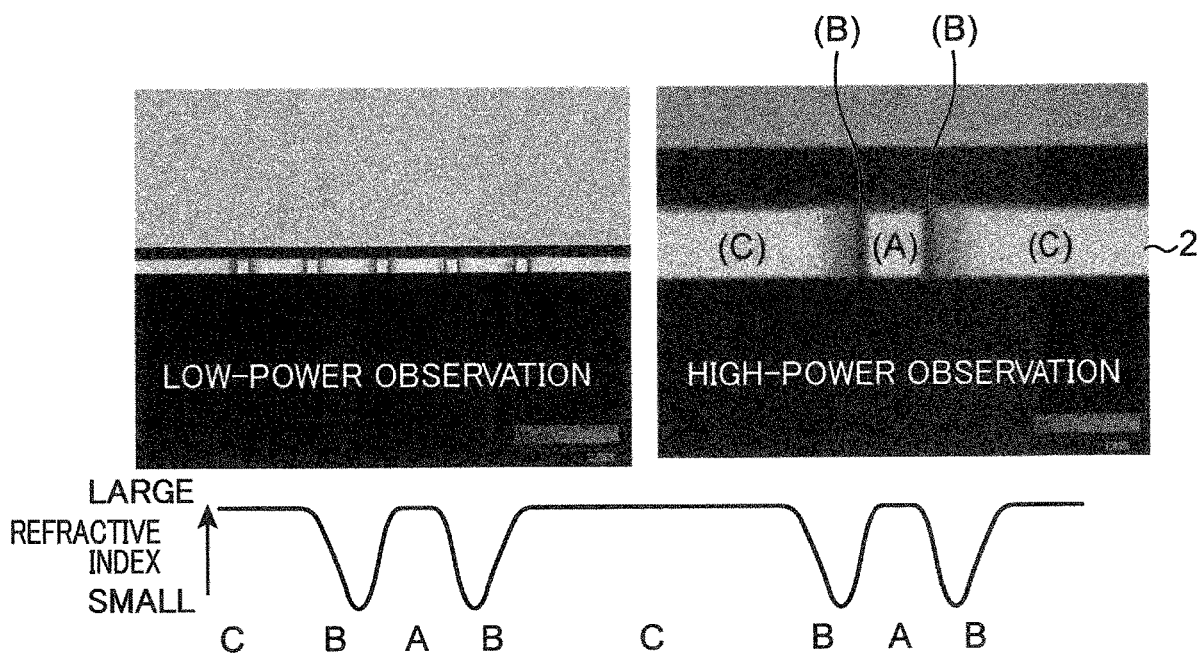
FIG. 17 is a cross-sectional photograph and a graph showing a refractive index distribution of an optical waveguide of a comparative example.

An optical waveguide was manufactured in the same manner as in the example, except that a glass mask including a halftone portion 11 with a transmittance of 10% was used as a glass mask 5, and refractive index distribution in a core forming layer of the obtained optical waveguide was measured. FIG. 17 shows photographs and refractive index distribution of the optical waveguide of a comparative example. FIG. 17 also has the lower row that shows refractive index distribution in portions defined by broken lines in cross-section of a core forming layer 2, and the arrow indicate that the refractive index increases from below.

(Light Intensity Distribution Measurement)

As illustrated in FIG. 18, light intensity measurement was performed using a single mode fiber (SMF) as a light incident side cable and using a GI50 optical fiber with a core diameter of 50 μm as a light receiving side cable. As a light source, an 850 nm VCSEL laser was used, and light intensity was measured with a power meter.

Figure 18A:
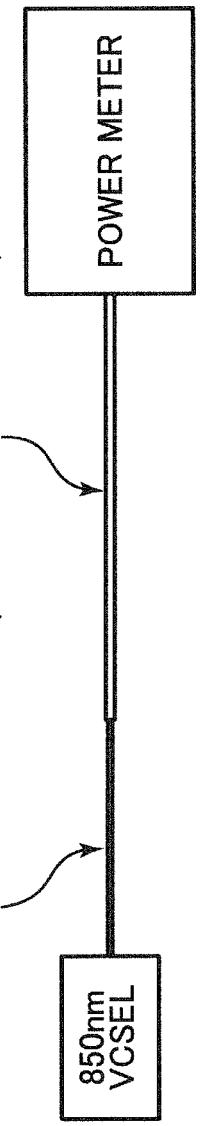
FIG. 18A and FIG. 18B are schematic diagrams illustrating a method for measuring light intensity distribution used in an example.
Figure 18B:
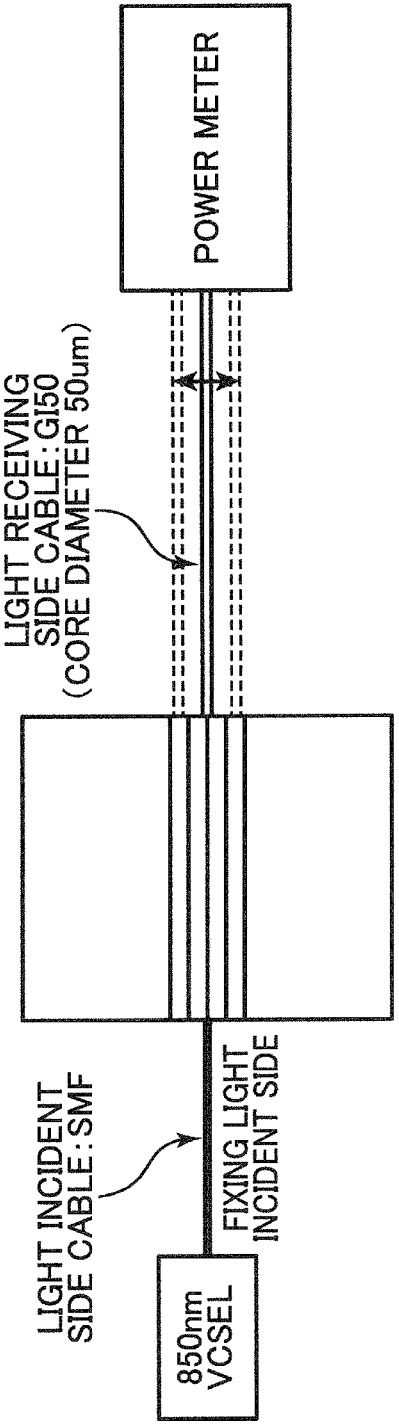

The light intensity was evaluated at a value of 10 log (P0/P1) where P0 was light intensity measured with the light incident side cable connected to the light receiving side cable without an optical waveguide (FIG. 18(A)), and P1 was light intensity measured with the optical waveguide inserted between the light incident side cable and the light receiving side cable (FIG. 18(B)). When light intensity distribution on an emission side of the optical waveguide was measured, the light incident side cable was fixed at a position of the optical waveguide, and then the light intensity distribution was obtained by scanning the light receiving side cable.

Figure 19:
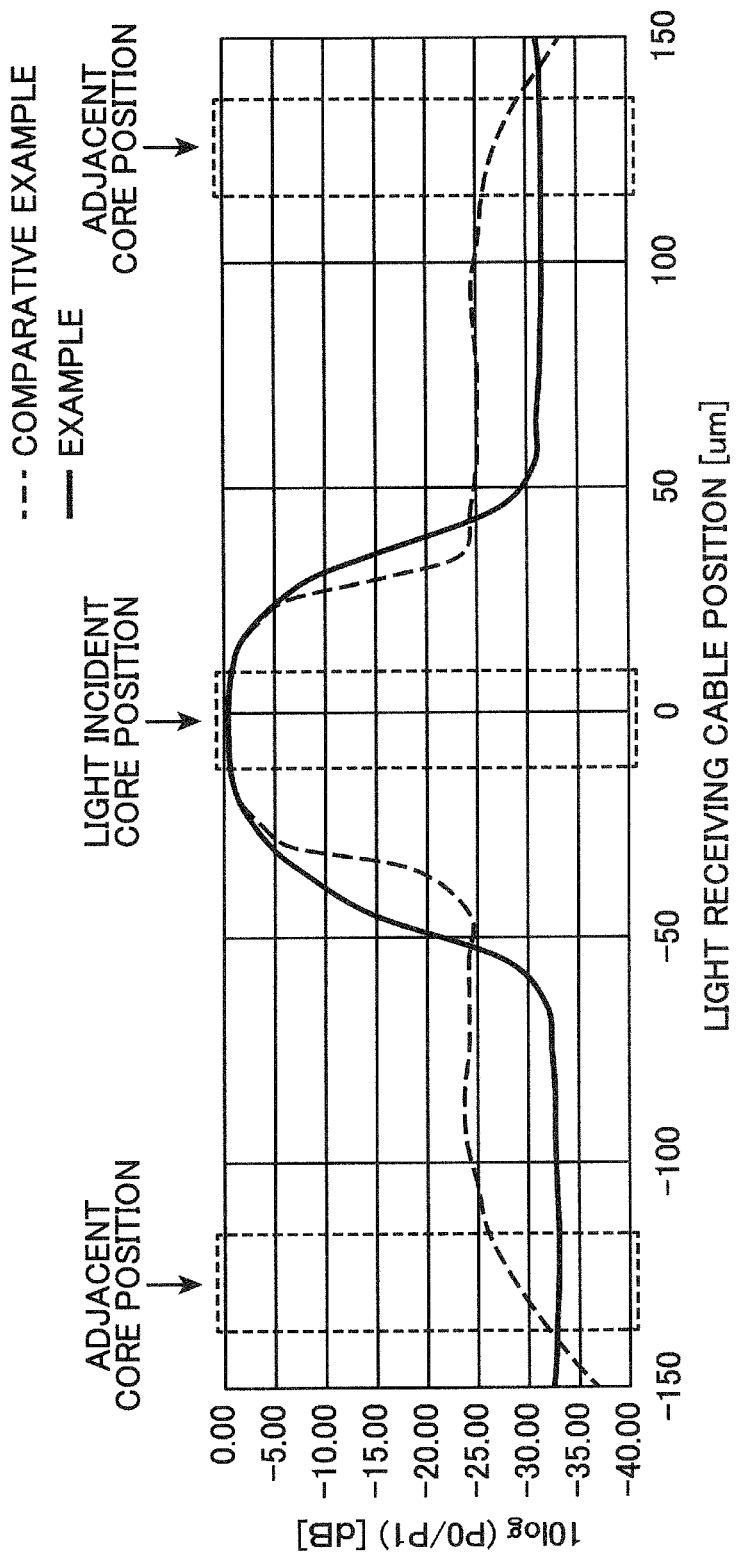
FIG. 19 is a graph of light intensity distributions of an example and a comparative example, in which a solid line indicates the example and a dotted line indicates the comparative example.

FIG. 19 shows results.

(Consideration)

It can be seen from FIG. 19 that the optical waveguide of the comparative example has larger light intensity in the region (C) and in the vicinity of the adjacent core portion than the optical waveguide of the example satisfying the structure of the present invention to cause crosstalk to be not sufficiently reduced. This is probably because the region (B) has no portion with a constant refractive index, and the refractive index changes continuously from the region (B) toward the region (C).

This application is based on Japanese Patent Application No. 2017-216095 filed on Nov. 9, 2017, the contents of which are included in the present application.

To express the present invention, while the present invention has been described above appropriately and sufficiently through the embodiments with reference to specific examples and the like, it should be recognized that it is easy for those skilled in the art to change and/or improve the above-described embodiments. Thus, unless modification or improvement performed by a person skilled in the art is at a level that departs from the scope of right set forth in the scope of claims, it is interpreted that the modification or the improvement is included in the scope of right of claims.

INDUSTRIAL APPLICABILITY

The present invention has wide industrial applicability in the technical field related to optical waveguides and photoelectric composite wiring boards.

The invention claimed is:

1. An optical waveguide, comprising:
   a core forming layer with a high refractive index; and
   a first clad layer with a low refractive index, bonded to a first main surface of the core forming layer,
   wherein the core forming layer is provided in a plane direction with a core portion (A), lateral clad portions (B) each having one side adjacent to a corresponding side of the core portion (A), and high refractive index portions (C) each adjacent to another side of a corresponding one of the lateral clad portions (B),
   the core portion (A) is provided in its plane direction with a central region, and GI regions in each of which a refractive index continuously decreases from the central region toward an interface with the corresponding one of the lateral clad portions (B),
   the lateral clad portions (B) each includes a region having a constant refractive index, and
   the high refractive index portions (C) have broader width than the lateral clad portions (B).

2. The optical waveguide according to claim 1,
   wherein the central region of the core portion (A) has a constant refractive index.

3. The optical waveguide according to claim 1,
   wherein each of the high refractive index portions (C) has a region having a constant refractive index.

4. The optical waveguide according to claim 3,
   wherein the high refractive index portions (C) each have a second GI region in which the refractive index continuously increases from the interface with the corresponding one of the lateral clad portions (B) toward the region having the constant refractive index.

5. The optical waveguide according to claim 3,
   wherein the region having the constant refractive index in the high refractive index portions (C) has a refractive index equal to a refractive index in the central region of the core portion (A).

6. The optical waveguide according to claim 1,
   wherein the core forming layer has a curing degree of 50% or more as a whole.

7. The optical waveguide according to claim 1,
   wherein a second clad layer having a low refractive index is bonded to a second main surface of the core forming layer.

8. A method for manufacturing the optical waveguide according to claim 1, the method comprising, in sequence:
   a layering that brings an uncured transparent resin film for forming the core forming layer into contact with the first clad layer, and bonds the uncured transparent resin film and the first clad layer to each other;
   a first exposure of irradiating portions corresponding to the core portion (A) and the lateral clad portions (B) in a layered body obtained in the layering with active energy rays, using a mask including an opening and a halftone region having a transmittance of 20 to 80% at side edge portions across the opening, to semi-cure the irradiated portions; and
   a second exposure of irradiating the entire transparent resin film with active energy rays for further curing.

9. The method for manufacturing an optical waveguide according to claim 8, further comprising:
   a heat treatment of heat-treating the layered body between the first exposure and the second exposure.

* * * * *